INVENTOR.
OTTO ZAUNER

INVENTOR.
OTTO ZAUNER

March 2, 1965　　　O. ZAUNER　　　3,171,730
METHOD AND APPARATUS FOR FORMING MOUTH
PORTIONS OF SMALL GLASS BOTTLES
Filed Sept. 19, 1960　　　3 Sheets-Sheet 3

INVENTOR.
OTTO ZAUNER
BY W. A. Schaich &
E. J. Holler
ATTORNEYS

United States Patent Office 3,171,730
Patented Mar. 2, 1965

3,171,730
METHOD AND APPARATUS FOR FORMING MOUTH PORTIONS OF SMALL GLASS BOTTLES
Otto Zauner, Vineland, N.J., assignor, by mesne assignments, to Owens-Illinois Glass Company, Toledo, Ohio, a corporation of Ohio
Filed Sept. 19, 1960, Ser. No. 56,975
9 Claims. (Cl. 65—109)

The present invention relates to method and apparatus for forming small glass bottles, vials or the like and more particularly to accurately shaping the neck and mouth portions of such glass containers to provide an external screw-thread finish, for example.

The subject invention generally pertains to improved apparatus for use in conjunction with one or more types of forming machines adapted to manufacture small glass bottles from glass tubing. Such machines may be constructed in accordance with known forming equipment and especially rotary machines adapted to manufacture small glass bottles, vials or tubes for laboratory use as well as to contain pharmaceutical products and medicinal preparations.

One type of such rotary machine which has been utilized previously in the manufacture of a plurality of small glass containers from lengthy sections of glass tubing is described and illustrated in U.S. Patent No. 2,935,819, issued to Jakob Dichter on May 10, 1960, entitled "Machine for the Manufacture of Small Glass Bottles or the Like From Glass Tubes."

The machine described in this patent includes two groups of workpiece holders which when viewed in plan move through two adjacently disposed and mutually contacting circular paths each containing a series of work stations and having a common contact point at an overlapping region. A partially formed separated workpiece consisting of a glass tube which previously has been carried by a holder of the first group is retained by a holder of the second group to form the unfinished end of the tube stock with a smooth-edged opening and to facilitate subsequent completion of each individual container.

The machine and method of operation described in the aforementioned patent are utilized to form small glass containers having regular or smoothly contoured mouth openings of acceptable dimensions. Normally, the mouth portion is thickened to form a uniformly beaded rim.

According to the patent disclosure, when it is desired to produce a threaded finish on the outer wall of the neck, one or more shaping tools such as a roller having a thread-forming contour on its shaping surfaces is brought to bear on the open end portion of the workpiece. However, it has been found that when one or more freely-rotatable circular thread-forming tools are employed to form the screw thread and the tools are simply frictionally rotated by contacting the rotating tube stock, it is exceedingly difficult or virtually impossible to produce large quantities of like containers having dimensionally accurate screw-thread finishes during production campaigns of any appreciable duration.

The use of a single roller-type tool imparts maximum unbalanced forming pressure to the machine elements causing undue wear, while the use of a pair of tools which are frictionally driven requires excessive forming time due to lack of alignment between the forming surfaces of the tools, and in both cases, irregular thread formation of poor quality results. Dimensional control of the screw-thread finish of large quantities of finally-formed high-quality containers has not been readily obtainable by the use of either one or two frictionally-rotated shaping tools brought to bear against the neck portion of the workpiece in heat-softened condition due to off-center application of unbalanced forming pressures and the resultant excessive wear of component parts of the machine. These factors require constant machine maintenance and considerable down time adversely affecting production efficiency.

Thus, shaping neck and mouth portions of small glass containers fabricated from lengths of tubing with the Dichter machine frequently results in widely varying dimensions and contours particularly in forming screw threads. This condition is primarily due to relatively rigid mounting of the container blank and shaping tools requiring the tools to be moved into engagement with the blank in extremely exact alignment for the shaping operation. Such rigidly mounted tools are inadequate to allow for deviations in slightly varying diameters of tubing from which the containers are made in rapid successive operations. The diminutive character of the containers and their relatively low unit cost require that the ware be produced most expediently and efficiently with minimized rejection rates due to inaccurate and varying external screw-thread dimensions. Otherwise, complemental screw-threaded closures manufactured for cooperation therewith must allow for greater latitude of dimensional variation making the attainment of durable and effective sealing considerably more difficult.

Accordingly, it is an object of the present invention to provide method and apparatus for accurately forming the neck and mouth portions of a small glass container having a desired finish configuration to obtain effective sealing.

Another object of the present invention is to provide apparatus for accurately shaping the open end portion of a tubular glass workpiece with a precisely contoured readily reproducible screw-thread finish.

Another object of the present invention is to provide self-centering glass shaping mechanism which is adapted to efficient formation of a screw-threaded finish on small glass containers which apparatus is readily applicable to yieldable movement to accommodate itself to container blanks of varying diameter.

A further object of the present invention is to provide a method of forming a screw-thread finish on the open end portion of a small glass container by a pair of self-centering circular forming dies adapted to synchronous rotation and balanced forming pressure to provide a finish having precise contours and dimensions.

The specific nature of this invention as well as other objects and advantages thereof will become apparent to those skilled in the art from the following detailed description taken in conjunction with the annexed sheets of drawings on which, by way of preferred example only, are illustrated the preferred embodiments of this invention.

The subject apparatus as illustrated in a preferred embodiment is especially suitable for tooling the lip, mouth and neck portions of small glass bottles during their temporary retention at an individual work station while rotated axially, an open end portion of each bottle blank being acted upon by the combined apparatus which comprises my invention. The invention is equally applicable to tooling larger or smaller surface areas of a wide variety of different types of tubular glass articles having different diameters and is not to be considered as limited to tooling relatively small-size glass bottles except as defined by the scope of the appended claims.

Figure 1:
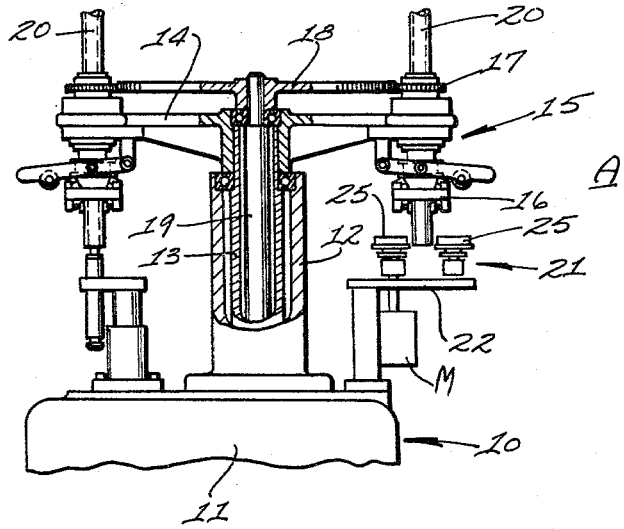
FIG. 1 is a front elevational view partially in vertical section of a glass forming machine embodying the present invention.
Figure 2:
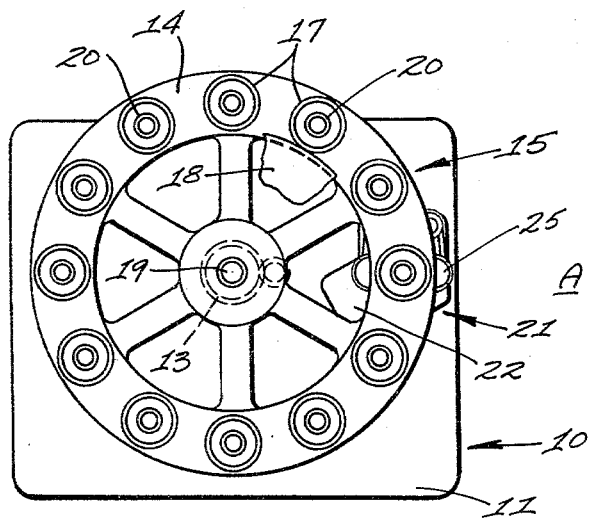
FIG. 2 is a top plan view of the machine shown in FIG. 1 illustrating the disposition of the mouth forming apparatus.

As illustrated on FIGS. 1 and 2 the forming machine 10 consists generally of a stationary base member 11 and an upright pedestal bearing 12 in which is journalled a hollow shaft 13 which extends downwardly into the machine base. The upper end of hollow shaft 13 supports a horizontally-disposed rotary support ring 14 which carries an equi-spaced series of tube stock retaining mechanisms 15 each having a chuck 16. Each of the chucks is rotatable and is rotated continuously in the same direction and in synchronism by a spur gear 17 connected thereto at an upper region of retaining mechanism 15. A large wheel 18 is rotatably journalled within an upper region of support ring 14 and a drive shaft 19 extends downwardly through hollow shaft 13 into the machine base to drive the series of chuck rotating gears 17. Thus, the plurality of chucks 16 can be driven at any desired speed of rotation independently of the indexing movement of support ring 14 through a series of successive work stations.

The glass bottles are preferably formed from lengthy sections of glass tubing 20 which are retained by chucks 16 in vertical relation during formation of the lower open portion of each workpiece with which the present invention is specifically concerned. Following completion of the end forming operation each chuck mechanism can be individually released to permit separation of the tube stock at a prescribed intermediate region and final forming of the closed end portion of each container.

At the work station A shown on the right-hand side of FIGS. 1 and 2 the lower end portion of the tube stock having its lower end portion in heat-softened plastic condition is brought into engagement with the end forming apparatus 21 constructed and operated in accordance with my invention.

The apparatus briefly stated consists of a pair of power-driven forming dies 25 which are mounted on a base member 22 in a plane normal to the axis and aligned normal to the direction of movement of tubular workpiece 20 toward and away from work station A. The forming dies are preferably disposed in horizontally aligned relation on a radial line extending from the center of the machine.

Figure 3:
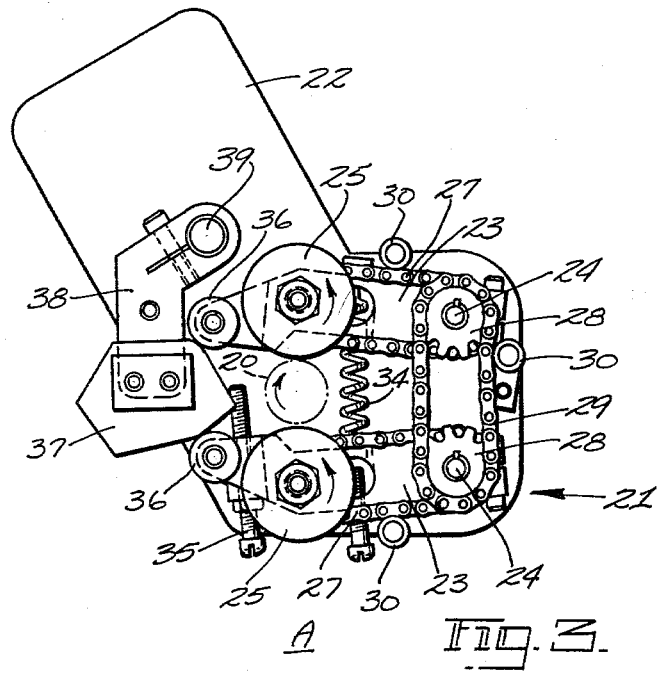
FIG. 3 is an enlarged plan view of the mouth shaping apparatus only disposed at an individual work station shown on the right hand side of FIGS. 1 and 2, the apparatus being shown in open arrangement to facilitate the ingress and egress of a tubular workpiece.

As shown in FIG. 3 base plate 22 extends horizontally beneath and in proximity to the lower end of tubing stock 20. A pair of movable arms 23 are mounted in pivotal relation on base plate 22 with an upright shaft 24 journaled in and connecting each arm and the base constituting the pivot point of the former. A pair of circular rotatable forming dies 25 are mounted on the cantilevered free ends of arms 23 with one die individual to each arm. Each die 25 is supported by a short upright shaft mounted within a suitable bearing to permit its rotation and has a sprocket member 26 affixed thereto. A pair of similar sprockets 28 are fixedly connected to the upright rotary shafts 24 carrying each arm, the sprockets having an endless chain 29 extending therearound. Also connected to each shaft 24 is another sprocket 26a disposed in alignment with each die driving sprocket 26 around which extends an endless chain 27. Thus, the pair of forming dies 25 are interconnected by the pairs of individual driving chains 27 coextensive with each arm 23 and common driving chain 29 extending between mounting shafts 24 of the pivoted arms. Idler rollers 30 are mounted to bear against the individual chains 27 and 29 to maintain proper tension and adjustment.

Figure 5:
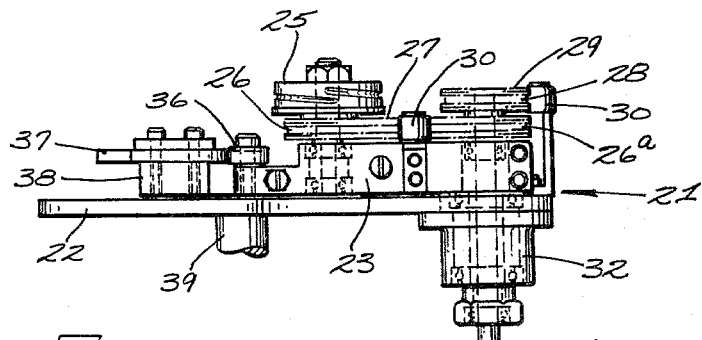
FIG. 5 is a side elevational view of the mouth forming apparatus.
Figure 6:
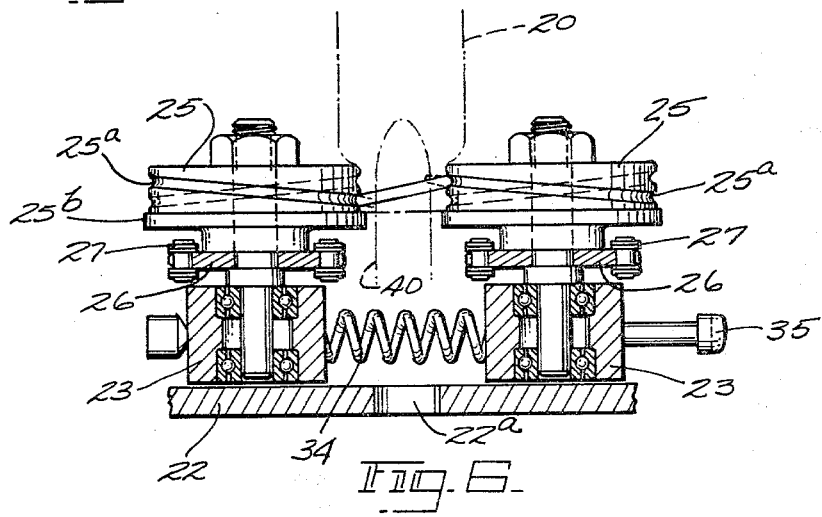
FIG. 6 is a further enlarged vertical sectional view taken along the line 6—6 of FIG. 4.
Figure 7:
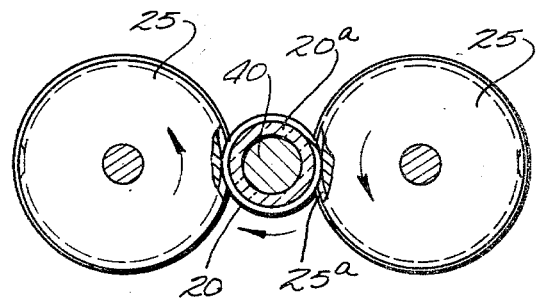
FIG. 7 is a further enlarged plan view of the workpiece and pair of forming dies only in shaping relation.

As shown in FIG. 5 one shaft 24 extends downwardly through base plate 22 and is supported by a suitable bearing housing 32 for interconnection with suitable driving means. The driving means consists of an electric motor designated by the letter M (FIG. 1) operated in timed synchronism with other operative elements of the machine or the common source employed to power the machine. Thus, dies 25 are rotated at the same peripheral speed of rotation in the same direction and in synchronism with tube stock 20.

Figure 4:
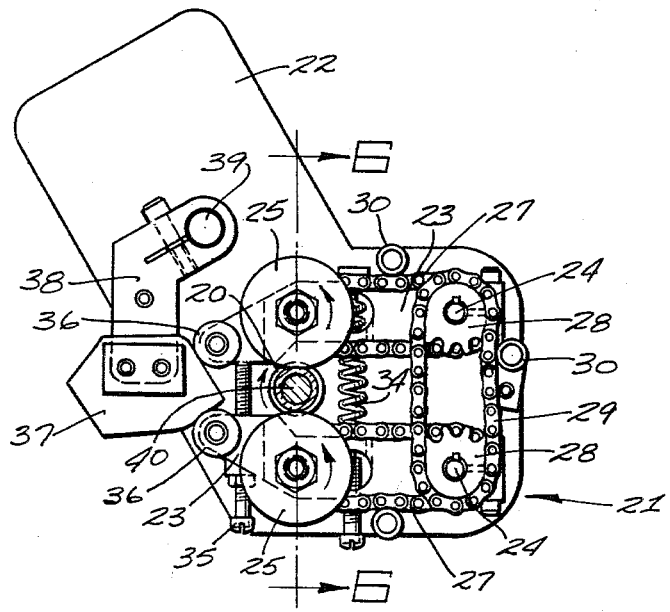
FIG. 4 is a view similar to FIG. 3 showing the mouth forming apparatus in closed arrangement effecting shaping of the mouth portion of the workpiece.

A tension spring 34 is disposed between and interconnects intermediate regions of the two arms 23 as shown in FIGS. 3, 4 and 5. The tension spring is adjustable as by a set screw to provide the necessary amount of forming pressure on the workpiece when dies 25 are brought into engagement with the workpiece by pivotal movement of arms 23 into near relation.

A stop member 35 consisting preferably of a lengthy threaded machine bolt is mounted in adjustable relation in a free end portion of one arm 23 extending toward the other arm. The projecting end of the stop member is adapted to contact the other arm to control the minimum spacing between dies 25.

The terminating free end portions of each arm 23 have a freely-rotatable cam roller 36 mounted thereon. An angular cam 37 having working surfaces in the form of a wedge is carried by an arm 38 and is mounted for contacting the pair of cam rollers 36 to separate the free ends of arms 23. Cam supporting arm 38 is fixedly attached to a rocker arm 39 which extends downwardly through base plate 22 into the machine base. Rocker arm 39 is oscillated through a small angle to control the relative position of the forming dies.

Rocker arm 39 is rotated in a counterclockwise direction prior to the interval when the supporting ring 14 moves the chuck 16 and workpiece 20 from one work station to another. During this interval cam 37 separates the free end of arms 23 by retraction of cam rollers 36 to facilitate the ingress and egress of the tube stock to and from forming station A. End forming apparatus 21 is shown with the forming dies in open relation in FIG. 3 while FIG. 4 illustrates the dies in closed end-forming arrangement.

During end forming rock shaft 39 is rotated clockwise through a small angle and cam 37 is moved from right-to-left permitting cam rollers 36 to be moved into near relation by spring 34 as shown in FIG. 4. Forming dies 25 having similar thread-forming shaping surfaces 25a bear against the open end of tube stock 20 in self-centering relation with equalized pressure applied to opposing sides thereof to form a uniform smoothly contoured screwthread. The dies are drawn together by tension spring 34 until stop member 35 contacts the inner surface of opposite arm 23. The prescribed setting placed upon stop member 35 accurately controls the external dimension of the threaded finish.

A vertically reciprocable mandrel 40 is positioned at station A of the forming machine to penetrate the open end portion of tube stock 20. The mandrel is retained in essentially axial alignment with the workpiece at the work station to form the inner surfaces of the mouth portion when forming dies 25 are brought to bear against and form the exterior contour. The mandrel is operable through an opening 22a in the base 22.

Operation of the subject apparatus and the improved method of forming a screw thread finish may be summarized as follows:

The tubular glass blank has its lower end portion heated into thermally-softened workable condition at one or more stations disposed immediately ahead of work station A. At these several stations the workpiece is axially rotated by the retention chuck so that the terminating region of the lower end portion is maintained in prescribed vertical alignment. The tube stock thus projects downwardly from the chuck in vertical relation to a position on a horizontal plane with a lip forming portion 25b of the forming dies. Immediately upon arrival of the tube stock 20 at work station A the vertically operable mandrel 40 is moved upwardly to penetrate the lower end portion of the tubular blank to extend above the forming dies 25. Cam 37 is then moved from right-to-left a short distance by angular movement of rock shaft 39 with cam rollers 36 being maintained in contact with the bevelled surfaces of the cam. During this interval the pair of forming dies 25 are rotated continuously at the same peripheral speed of rotation as the lower end portion of the tube stock. The dies are rotated in such manner that their thread forming contours are maintained in aligned relation so that a continuous thread is expeditiously formed on the workpiece. During this interval the mandrel is held in substantially stationary relation while both the workpiece and forming dies are rotated. The dies are rotated in the same direction while the workpiece is rotated at the same angular velocity to obtain essentially drag free contact between the forming surfaces and surfaces to be formed. Essentially uniform compressive loading is applied to the workpiece to reduce its external dimensions and to fill the intervening space between the mandrel and the forming dies. Concurrently therewith the container lip portion is formed by the lower shoulder portion 25b of each die. Cam 37 is substantially fully withdrawn from between cam rollers 36 to permit stop member 35 to contact the opposing arm to form the fully finished screw-thread. Following tooling of the full thread cam 37 is then moved from left-to-right to separate the forming dies from the workpiece and to permit the tube stock bearing the newly-formed screw-threaded finish 20a to be removed from the work station.

The unfinished glass tube is then further heated and separated at a prescribed region at one or more subsequent stations in accordance with known practice to complete the article formation such as described in the aforementioned Dichter patent.

Various modifications may be resorted to within the spirit and scope of the appended claims.

I claim:

1. Apparatus for shaping the neck and mouth portions of a small glass bottle blank in workable condition during its retention at an individual work station of a forming machine, said apparatus comprising, in combination, a chuck for retaining the glass bottle blank, means for axially rotating said chuck and said bottle blank at said work station, a base member mounted in stationary relation at said work station beneath said chuck, a pair of movable arms mounted in pivotal relation on said base member, each arm having a projecting free end portion extending near said bottle blank, a pair of similar circular rotary external forming dies individually mounted on the free end portion of each arm in peripherally aligned coplanar arrangement, driving means adapted to rotate continuously said pair of circular forming dies conjunctively and in synchronism with said bottle blank, a reciprocatable non-rotating mandrel element adapted to penetrate said blank for relative movement therebetween, and means adapted to regulate the spacing between said dies for shaping the bottle neck and mouth portions therebetween.

2. The combination in accordance with claim 1, wherein said means adapted to regulate the spacing between said dies comprises a tension spring connecting the said pivotally mounted movable arms, an adjustable stop member extending between said arms adapted to control the minimal spacing between said dies, and a movable cam member operative between the free ends of said arms to separate said dies to facilitate ingress and egress of said bottle blank.

3. The combination in accordance with claim 1, wherein said driving means adapted to rotate said forming dies comprises a pair of rotatable sprockets and an endless driving belt connecting said sprockets mounted on and individual to each movable arm, one sprocket connected to a forming die and another disposed at a pivotal region of said arm, a secondary endless driving belt connecting the said sprockets disposed at the pivotal regions of said arms, and a rotary drive shaft connected to a latter sprocket to rotate said forming dies conjunctively and at the same peripheral speed of rotation as the neck and mouth portions of said bottle blank.

4. The combination in accordance with claim 1, wherein said pair of circulatory rotary forming dies have similar thread-forming contours on their shaping surfaces and are disposed in peripherally aligned coplanar relation with said bottle blank to form conjunctively a continuous integral thread on its exterior mouth portion.

5. The combination in accordance with claim 1, wherein said mandrel element is reciprocatably mounted at said work station adapted to introduction stationarily within the open end portion of said bottle blank, said pair of circular forming dies being disposed on opposing sides and normal to the direction of movement of said bottle blank toward and away from said work station.

6. Apparatus for forming an external screw-thread finish on the open-end portion of a small glass bottle in workable condition during its retention at an individual work station of a forming machine, the improvement comprising, in combination, a chuck for retaining a tubular glass workpiece, means for axially rotating said chuck and said workpiece during its retention at said work station, a base member mounted in stationary relation beneath said workpiece at said work station, a non-rotative reciprocatable mandrel mounted at said work station adapted to penetratae the open end portion of said workpiece, a pair of coplanar movable arms each having a cantilevered free end projecting adjacent the open-end portion of said workpiece and the other end pivotally mounted on said base member, a pair of rotatable circular external shaping elements individually attached to the free ends of said arms on opposing sides of said workpiece adapted to contact and shape its open-end portion, each shaping element having a similar thread-forming contour on its forming surfaces with the pair disposed in peripherally aligned relation, resilient means interconnecting the projecting free ends of said arms adapted to retain said shaping elements in self-centering contacting alignment with said workpiece, camming means adapted to separate the projecting free ends of said pivoted arms and their attached shaping elements, and driving means adapted to positively rotate said pair of shaping elements conjunctively and in synchronism with said workpiece.

7. In a process of forming a screw-thread finish on the open-end portion of a tubular glass workpiece in workable condition during its retention at an individual work station, the method comprising the steps of retaining said workpiece at said work station, axially rotating said workpiece thereat, introducing a non-rotative mandrel into the open end portion of said workpiece, positively rotating a pair of circular external forming dies disposed in coplanar spaced-apart peripherally aligned relation conjunctively and in synchronism with rotation of said workpiece, said forming dies having similar thread-forming contours, contacting opposing sides of the open-end portion of said workpiece with said pair of forming dies, movable in a single working plane, applying essentially uniform forming pressure to the opposing sides of said workpiece to form an external screw-thread finish thereon having prescribed dimensions, withdrawing the forming dies and mandrel from contact with said workpiece, and removing said workpiece from said work station.

8. The method in accordance with claim 7, including the step of rotating the said pair of forming dies at the same peripheral speed of rotation as the contacted open end portion of said workpiece.

9. The method in accordance with claim 7, including the step of applying balanced forming pressure to opposing surfaces of the open-end portion of said workpiece in workable condition by contracting movement of said spaced-apart forming dies in a plane normal to the axis of said workpiece to a prescribed minimal spacing to obtain a screw-thread finish having a prescribed dimension.

References Cited in the file of this patent

UNITED STATES PATENTS

| | | |
|---|---|---|
| 401,670 | Weichert et al. | Apr. 16, 1889 |
| 744,681 | Ergo | Nov. 17, 1903 |
| 2,935,819 | Dichter | May 10, 1960 |

FOREIGN PATENTS

| | | |
|---|---|---|
| 33,005 | Germany | Sept. 16, 1885 |
| 7,306 | Great Britain | of 1897 |
| 637,086 | France | Jan. 23, 1928 |